(12) United States Patent
Tiliakos et al.

(10) Patent No.: US 7,913,928 B2
(45) Date of Patent: Mar. 29, 2011

(54) ADAPTIVE STRUCTURES, SYSTEMS INCORPORATING SAME AND RELATED METHODS

(75) Inventors: Nicholas Tiliakos, Huntington, NY (US); Anthony Castrogiovanni, Manorville, NY (US)

(73) Assignee: Alliant Techsystems Inc., Minneapolis, MN (US)

( * ) Notice: Subject to any disclaimer, the term of this patent is extended or adjusted under 35 U.S.C. 154(b) by 1120 days.

(21) Appl. No.: 11/556,988

(22) Filed: Nov. 6, 2006

(65) Prior Publication Data

US 2007/0113932 A1 May 24, 2007

Related U.S. Application Data

(60) Provisional application No. 60/733,980, filed on Nov. 4, 2005.

(51) Int. Cl.
*G05D 23/02* (2006.01)
*F16K 17/14* (2006.01)
*F16K 31/12* (2006.01)

(52) U.S. Cl. ............ 236/101 E; 137/74; 137/77; 251/12

(58) Field of Classification Search ............... 236/101 A, 236/101 R, 101 E; 137/74, 75, 76, 77, 468; 137/487.5; 148/402; 417/292; 251/11, 12
See application file for complete search history.

(56) References Cited

U.S. PATENT DOCUMENTS

| | | |
|---|---|---|
| 3,436,017 A | 4/1969 | Elmer |
| 3,690,065 A | 9/1972 | Bucalo |
| 3,808,833 A | 5/1974 | Allen et al. |
| 3,908,936 A | 9/1975 | Durran |
| 4,581,624 A | 4/1986 | O'Connor |
| 4,739,952 A | 4/1988 | Giles |
| 4,821,997 A | 4/1989 | Zdeblick |
| 4,824,073 A | 4/1989 | Zdeblick |
| 4,943,032 A | 7/1990 | Zdeblick |
| 4,966,646 A | 10/1990 | Zdeblick |
| 5,050,838 A | 9/1991 | Beatty et al. |
| 5,054,522 A | 10/1991 | Kowanz et al. |

(Continued)

FOREIGN PATENT DOCUMENTS

EP 0261972 B1 12/1992

(Continued)

OTHER PUBLICATIONS

Angell, James B., et al., "Silicon Micromechanical Devices," Scientific American, Apr. 1983, pp. 44-55.

(Continued)

*Primary Examiner* — Chen-Wen Jiang
(74) *Attorney, Agent, or Firm* — TraskBritt

(57) ABSTRACT

Adaptive structures, systems incorporating such adaptive structures and related methods are disclosed. In one embodiment, an adaptive structure is provided that includes a first structure and at least one microstructure associated with the first structure. The at least one microstructure may include a microscale beam configured to be displaced relative to the first structure upon the adaptive structure being exposed to a specified temperature. The beam may be formed for example, of a metallic material, of multiple different metallic materials, or of a shape memory alloy. In one embodiment, a plurality of the adaptive structures may be associated with micropores of a skin panel. The adaptive structures may be utilized to control the flow rate of a coolant or other fluid through the micropores responsive to a sensed environmental parameter such as, for example, temperature.

23 Claims, 12 Drawing Sheets

U.S. PATENT DOCUMENTS

| | | | |
|---|---|---|---|
| 5,058,856 | A | 10/1991 | Gordon et al. |
| 5,065,978 | A | 11/1991 | Albarda et al. |
| 5,074,629 | A | 12/1991 | Zdeblick |
| 5,082,242 | A | 1/1992 | Bonne et al. |
| 5,209,291 | A | 5/1993 | Taylor |
| 5,291,830 | A | 3/1994 | Zwan |
| 5,333,831 | A | 8/1994 | Barth et al. |
| 5,529,279 | A | 6/1996 | Beatty et al. |
| 5,702,618 | A | 12/1997 | Saaski et al. |
| 5,785,295 | A | 7/1998 | Tsai |
| 5,825,275 | A | 10/1998 | Wuttig et al. |
| 5,899,067 | A | 5/1999 | Hageman |
| 5,909,078 | A | 6/1999 | Wood et al. |
| 5,954,079 | A | 9/1999 | Barth et al. |
| 5,955,817 | A | 9/1999 | Dhuler et al. |
| 5,969,736 | A | 10/1999 | Field et al. |
| 6,039,262 | A * | 3/2000 | DeAnna ............... 236/93 R |
| 6,070,851 | A | 6/2000 | Tsai et al. |
| 6,114,794 | A | 9/2000 | Dhuler et al. |
| 6,149,123 | A | 11/2000 | Harris et al. |
| 6,168,395 | B1 | 1/2001 | Quenzer et al. |
| 6,375,901 | B1 | 4/2002 | Robotti et al. |
| 6,386,507 | B2 | 5/2002 | Dhuler et al. |
| 6,494,433 | B2 | 12/2002 | Mastrangelo et al. |
| 6,527,003 | B1 | 3/2003 | Webster |
| 6,590,267 | B1 | 7/2003 | Goodwin-Johansson et al. |
| 6,613,560 | B1 | 9/2003 | Tso et al. |
| 6,626,417 | B2 | 9/2003 | Winger et al. |
| 6,629,820 | B2 | 10/2003 | Kornelsen |
| 6,761,420 | B2 | 7/2004 | Maluf et al. |
| 6,764,166 | B2 * | 7/2004 | Silverbrook ............... 347/54 |
| 6,877,528 | B2 | 4/2005 | Gilbert et al. |
| 6,883,337 | B2 | 4/2005 | Shyy et al. |
| 6,953,240 | B2 | 10/2005 | Cabal et al. |
| 6,988,706 | B2 | 1/2006 | Seeley et al. |
| 7,011,288 | B1 | 3/2006 | Slicker et al. |
| 7,055,781 | B2 | 6/2006 | Behrens et al. |
| 7,066,575 | B2 | 6/2006 | Silverbrook |
| 7,086,604 | B2 | 8/2006 | Phipps |
| 7,118,910 | B2 | 10/2006 | Unger et al. |
| 7,125,103 | B2 | 10/2006 | Silverbrook |
| 7,143,762 | B2 | 12/2006 | Harrison et al. |
| 7,152,960 | B2 | 12/2006 | Silverbrook |
| 7,177,505 | B2 | 2/2007 | Willcox |
| 7,188,931 | B2 | 3/2007 | Cabal et al. |
| 7,243,705 | B2 | 7/2007 | Myers et al. |
| 2002/0177891 | A1 | 11/2002 | Parodi |
| 2003/0002994 | A1 * | 1/2003 | Johnson et al. ............... 417/292 |
| 2003/0098899 | A1 | 5/2003 | Jung et al. |
| 2003/0175947 | A1 | 9/2003 | Liu et al. |
| 2004/0076531 | A1 | 4/2004 | Takeuchi et al. |
| 2004/0086427 | A1 | 5/2004 | Childers et al. |
| 2005/0095143 | A1 | 5/2005 | Bernard et al. |
| 2005/0116798 | A1 | 6/2005 | Bintoro et al. |
| 2005/0153273 | A1 | 7/2005 | Wikswo et al. |
| 2009/0095927 | A1 | 4/2009 | McCarthy et al. |

FOREIGN PATENT DOCUMENTS

| | | | |
|---|---|---|---|
| EP | 1031735 | A2 | 8/2000 |
| EP | 0708331 | B1 | 3/2004 |
| EP | 1544524 | A1 * | 6/2005 |
| GB | 2292608 | A | 2/1996 |
| JP | 61089998 | A * | 5/1986 |
| JP | 2000054122 | A * | 2/2000 |
| WO | 9508716 | A2 | 3/1995 |
| WO | 9804108 | A1 | 1/1998 |
| WO | 9924744 | A1 | 5/1999 |
| WO | 9939120 | A1 | 8/1999 |
| WO | 0101025 | A2 | 1/2001 |
| WO | WO 2004092581 | A1 * | 10/2004 |
| WO | 2004109163 | A2 | 12/2004 |
| WO | 2005107938 | A2 | 11/2005 |
| WO | 2005112156 | A2 | 11/2005 |
| WO | WO 2007/056267 | | 5/2007 |

OTHER PUBLICATIONS

Becker, Mike, et al., "Electrostatic beam actuator for switching applications fabricated by Ni-microelectroplating and thermal postprocessing," Proc. of SPIE, vol. 4981, 2003, pp. 71-82.

Gabriel, K.J., et al., "A Micro Rotary Actuator Using Shape Memory Alloys," Sensors and Actuators, vol. 15, 1988, pp. 95-102.

Goll, C., et al., "An electrostatically actuated polymer microvalve equipped with a movable membrane electrode," J. Micromech. Microeng., vol. 7, 1997, pp. 224-226.

Jerman, Hal, "Electrically-Activated, Micromachined Diaphragm Valves," IEEE Solid-State Sensor and Actuator Workshop, 1990, pp. 65-69.

Jeung, Won-Kyu, et al., "Large Displacement Out-Of-Plane Bimorph Actuator for Optical Application," Key Engineering Materials, vols. 326-328, 2006, pp. 1383-1386.

Kohl, M., et al., "Development of Microactuators Based on the Shape Memory Effect," Internat'l. Conference on Martensitic Transformations, Journal de Physique IV, Colloque C8, Supplement of Journal de Physique III, No. 12, vol. 5, Dec. 1995, pp. C8-1187 through C8-1192.

Kohl, M., et al., "Development of stress-optimised shape memory microvalves," Sensors and Actuators, vol. 72, 1999, pp. 243-250.

Kohl, Manfred, et al., "Shape memory micromechanisms for microvalve applications," Smart Structures and Materials 2004: Active Materials: Behavior and Mechanics, Proceedings of SPIE, vol. 5387, Mar. 15-18, 2004, pp. 106-117.

Kohl, M., et al., "SMA microactuators for microvalve applications," J. Phys. IV France, vol. 115, 2004, pp. 333-342.

Krulevitch, P., et al., "Thin Film Shape Memory Alloy Microactuators," 1996 ASME Internat'l. Mechanical Engineering Congress and Exposition, Micro-Electro-Mechanical Systems (MEMS), DSC-vol. 59, 1996, pp. 301-306.

Lisec, T., et al., "Thermally Driven Microvalve with Buckling Behaviour for Pneumatic Applications," IEEE, 0-7803-1833-1/94, 1994 pp. 13-17.

McCarthy, Matthew, et al., "Characterization and Modeling of Thermal Buckling in Eccentrically Loaded Microfabricated Nickel Beams for Adaptive Cooling," 2005 ASME Internat'l. Mechanical Engineering Congress and Exposition, Micro-Electro-Mechanical Systems, MEMS-vol. 7, Nov. 5-11, 2005, pp. 689-698.

Shoji, Shuchi, et al., "Microflow devices and systems," J. Micromech. Microeng., vol. 4, 1994, pp. 157-171.

Tabib-Azar, M., et al., "Applications of TiNi thin film shape memory alloys in micro-opto-electro-mechanical systems," Sensors and Actuators, vol. 77, 1999, pp. 34-38.

Tani, J., et al., "Application of shape memory alloy with all-round effect to flow control values," 4th European Conference on Smart Structures and Materials in Conjunction with the 2nd Internat'l. Conference on Micromechanics, Intelligent Materials and Robotics, Harrogate, UK, Jul. 6-8, 1998, pp. 337-340.

Takagi, Toshiyuki, et al., "Electromagneto Thermo-Structural Analysis of an ARSME Plate," Japanese Mechanical Society Papers Collection (Part C), vol. 64, No. 624, 1998, pp. 182-189.

Takagi, Toshiyuki, et al., "A Study of an Electromagnetic Induced Heating Type SMA Valve," The Japan Society of Mechanical Engineering, 74th Edition, Lecture Presentation, Research Paper (I), 1997, 2 pages.

McCarthy et al., U.S. Appl. No. 60/802,380, filed May 22, 2006.

McCarthy et al., U.S. Appl. No. 60/817,673, filed Jun. 30, 2006.

McCarthy et al., U.S. Appl. No. 60/830,500, filed Jul. 13, 2006.

* cited by examiner

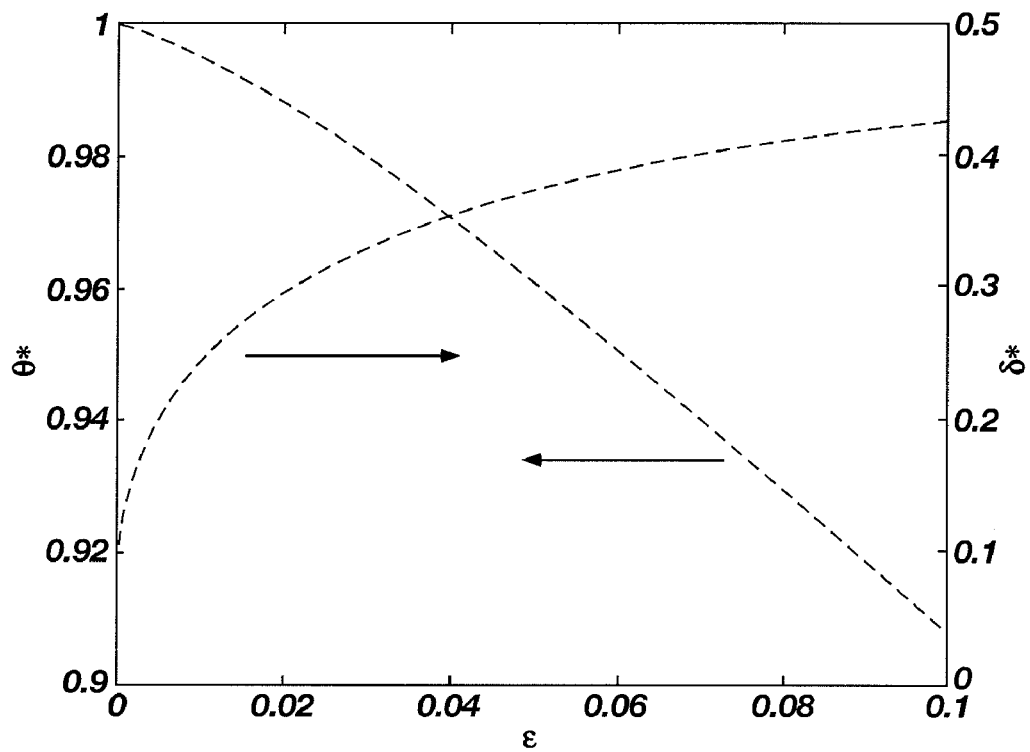
FIG. 9
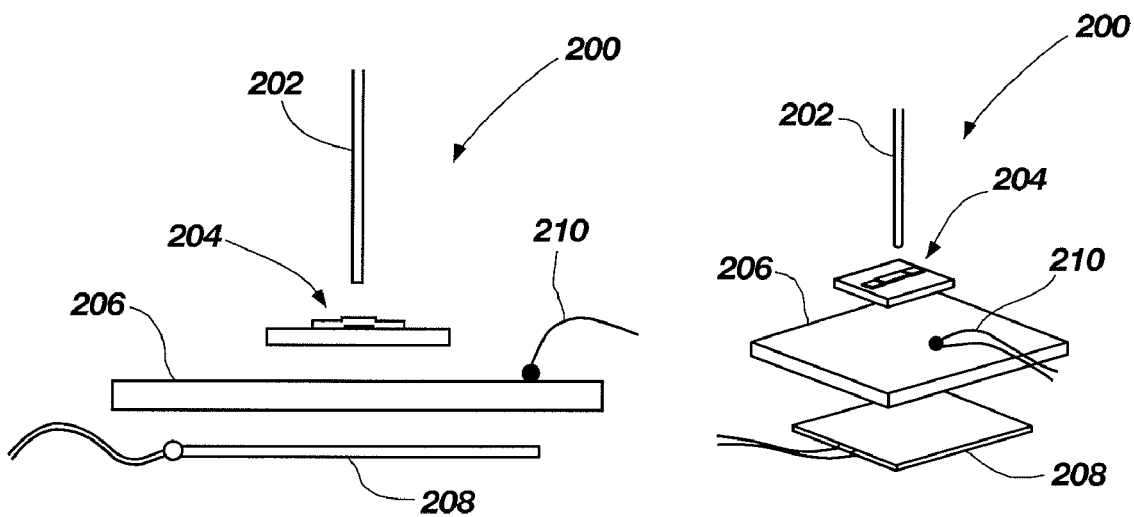
FIG. 10A      FIG. 10B

ADAPTIVE STRUCTURES, SYSTEMS INCORPORATING SAME AND RELATED METHODS

CROSS-REFERENCE TO RELATED APPLICATION

This application claims the priority filing date of U.S. Provisional Patent Application Ser. No. 60/733,980 filed Nov. 4, 2005, the disclosure of which is incorporated by reference herein in its entirety.

FIELD OF THE INVENTION

The present invention is related generally to adaptive structures, systems incorporating such adaptive structures and related methods. More particularly, the present invention is related to mechanisms and structures constructed and operative at the microscale that may be used individually or as part of a system for adapting and responding to environmental changes including time varying and location varying environmental parameters.

BACKGROUND OF THE INVENTION

There are numerous circumstances in which a structure experiences time varied and location varied state changes. Such state changes may be heavily influenced by the environment in which the structure is placed or is operating. For example, there are numerous structures that experience a change in temperature, with the temperature varying from one location of the structure to another (i.e., temperature gradients and localized heating or cooling of the structure), and wherein the structure experiences changes in temperature at different times. In other words, such a temperature or other condition is often transient and asymmetric in multiple dimensions.

Often, it is desirable to manage the temperature (or other parameter or condition) of such structures. However, efforts to control such parameters in a structure have conventionally included "blanket" approaches that are generally conservatively designed, often for worst-case scenarios.

For example, one structure that is desirably maintained within a certain temperature range includes the leading edge of a wing foil on supersonic or hypersonic aerospace vehicle. Similarly, the wall (or some other component) of an engine that is associated with high-speed aerospace vehicles experiences substantial temperature variations and may require some form of thermal management for effective operation of the vehicle. Depending, for example, on the current speed of the vehicle, the acceleration pattern of the vehicle and numerous other parameters, such surfaces and structures may experience very substantial temperature increases, with such increases sometimes occurring at a rather rapid pace and in a non-uniform manner.

Conventional cooling approaches for structures associated with, for example, high-speed aerospace vehicles, can be broadly classified as film cooling, where the wall is covered with a thin film of fresh coolant (often fuel), transpiration cooling, where the coolant is supplied uniformly through a porous wall, and wall cooling, where coolant flow convectively cools the back side of the wall. Conventionally, these approaches are implemented passively wherein one or more arrays of fixed orifices are supplied with a pressurized coolant without substantial control over the volume of coolant or the location to which such coolant is supplied. Such approaches can often present a number of challenges and problems.

During the trajectory of a typical hypersonic air-breathing vehicle (e.g., Mach 2-15), the heat transfer thermal loads can vary dramatically, from take-off to the mission altitude, as illustrated in FIG. 1. FIG. 1, which illustrates the large temporal variations of heat load on the external skin of a hypersonic vehicle for a typical mission, shows that the maximum convective heat transfer coefficient, "h" and the adiabatic wall temperature, $T_{aw}$, occur at different times in the trajectory of such a vehicle (note that the speed of such a vehicle after 95 seconds is approximately Mach 3). Such large variations in thermal loads impose tremendous demands on a vehicle thermal management system, typically requiring the cooling system to be designed for a fixed worst-case trajectory point. Though this design approach may provide adequate cooling at the highest thermal loads point, it comes at the expense of potentially over-cooling at other "off-design" points. This approach is inefficient, requires an undesirably high volume of coolant and places stringent demands on the thermal management system for the entire mission.

Similar inefficiencies may result from the spatial distribution of thermal loads over the surface of the structure being cooled. Uncertainty in predicting the temperature at any particular location within a given structure (e.g., the inlet, combustor, or nozzle walls of an engine) will lead to conservative coolant flow rates for the entire structure.

Numerous other structures likewise function more effectively if maintained within a desired temperature range (or within other specified parameter limits) but suffer from similar inefficiencies in maintaining the desired parameters. For example, with respect to temperature or thermal management, other examples of structures, where it is desirable to maintain the structure within a specified temperature range includes gas turbine blades, nuclear reactors, combustors, heat exchangers, rocket engines and various components of aerospace vehicles including hypersonic vehicles. In actuality, the number of components and structures that require some kind of parameter (e.g., thermal) management, and wherein the parameter is transient and asymmetrical is virtually limitless.

It is an ongoing desire to improve management of other parameters that may be time or spatially varied (or both). It would be advantageous to improve the efficiency and effectiveness of such parameter management including the use of structures, systems and methods that are adaptive in nature. For example, it is an ongoing desire to improve thermal management of various structures that exhibit time varied or spatially varied temperature changes.

SUMMARY OF THE INVENTION

In accordance with various embodiments of the present invention, adaptive structures, systems incorporating such adaptive structures and related methods are provided. In accordance with one embodiment of the present invention, a thermal management system is provided. The system includes a skin panel having a first surface, a second surface and at least one micropore extending from the first surface and the second surface. A flow path extends between a source of coolant and the at least one micropore. At least one adaptive structure is associated with the at least one micropore and is configured to alter a flow rate of coolant through the at least one micropore responsive to temperature sensed by the at least one adaptive structure.

In accordance with another embodiment of the present invention, an adaptive structure is provided. The adaptive structure includes a first structure and at least one microstructure associated with the first structure. The at least one microstructure includes a microscale beam configured to be displaced relative to the first structure upon the adaptive structure being exposed to a specified temperature.

In accordance with yet another embodiment of the present invention, a method of cooling a structure is provided. The method includes providing a source of coolant and flowing coolant from the source to a skin panel associated with the structure and through at least one micropore formed in the skin panel. An adaptive structure is associated with the at least one micropore and a temperature is sensed by the adaptive structure. A flow of coolant through the at least one micropore is altered by the adaptive structure responsive to the sensed temperature.

DESCRIPTION OF THE DRAWINGS

The foregoing and other advantages of the invention will become apparent upon reading the following detailed description and upon reference to the drawings in which:

FIG. 9 shows inflection point location $(\theta^*, \delta^*)$ as a function of fabricated beam eccentricity, $\epsilon$;

FIGS. 10A and 10B are schematics of an experimental setup;

DETAILED DESCRIPTION OF THE INVENTION

Figure 2A:
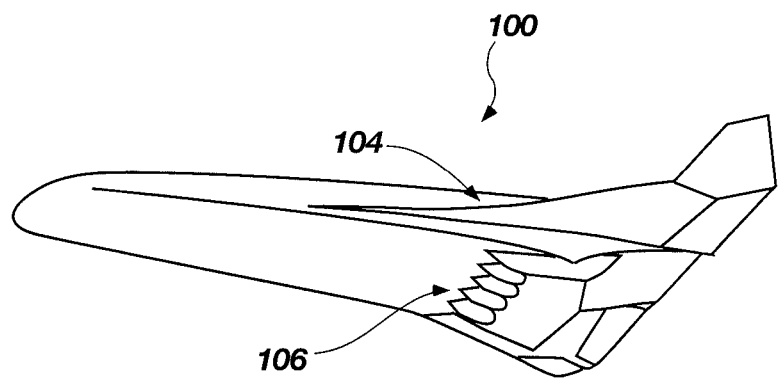
FIG. 2A shows an aerospace vehicle in accordance with an embodiment of the present invention.
Figure 2B:
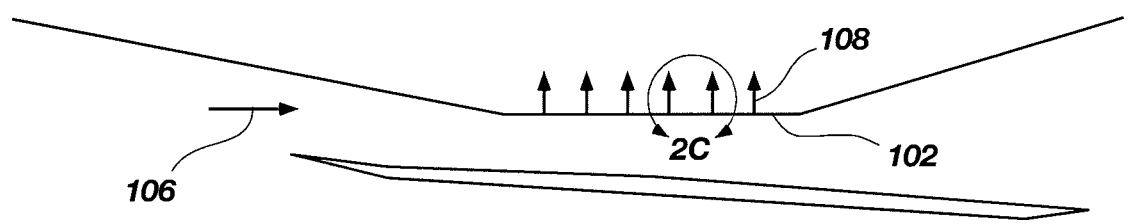
FIGS. 2B-2D show progressively enlarged, partial cross-sections of a component or structure of the aerospace vehicle of FIG. 2A.

Referring to FIG. 2A, an aerospace vehicle 100 is shown that has one or more components, structures or surfaces that experience transient parameter changes, asymmetrical parameter changes, or both, during operation thereof. For example, an engine wall 102, a nozzle wall or some other component associated with a propulsion system may experience varying temperatures during operation of the vehicle 100. Other components, such as a leading edge of an air foil 104 (or various other surfaces) may likewise experience transient and asymmetrical temperature changes. As shown in FIG. 2B, considering the wall 102 of an engine as an example, air flow 106 passes through a passage of the engine (such as a nozzle) at a rapid flow rate. In aerospace vehicles 100 that are designed, for example, to travel at a very high rate of speed, such as air breathing hypersonic vehicles (vehicles that travel at a rate of speed between approximately Mach 2 and Mach 15), temperatures within the engine may reach extreme levels and, therefore, require a thermal management system to transfer heat away from the engine wall 102 (or other structure) as generally indicated at 108.

Figure 2C:
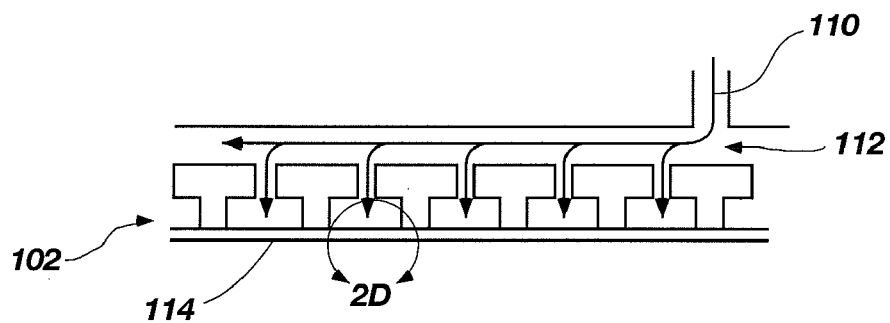
Figure 2D:
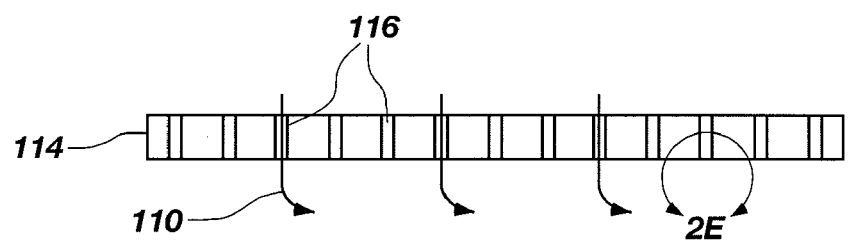

As shown in FIG. 2C, a thermal management system in accordance with one embodiment of the present invention may include a source of coolant 110 that passes along a flow path 112 to be distributed along a portion of the engine wall 102. The coolant 110 may be supplied as a pressurized coolant and, in one embodiment, may include fuel from the vehicle 100. As shown in FIGS. 2C and 2D, a structure, referred to herein as a skin or a skin panel 114, is associated with the engine wall 102 and may include one or more micron sized pores 116 through which the coolant 110 may flow, as needed or desired, for cooling the engine wall 102. In one embodiment, the skin panel 114 may be formed the exhibit a thickness of approximately 1 millimeter (mm) while the pores 116 may exhibit a diameter or cross-sectional width of approximately 100 to 200 micrometers (μm).

Figure 2E:
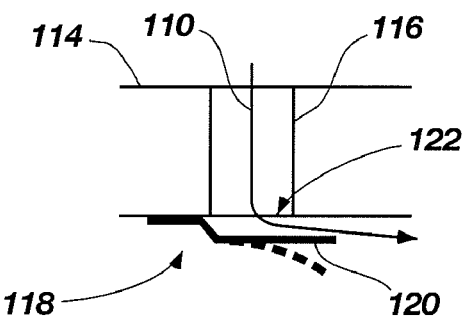
FIG. 2E shows a cross-sectional view of a microstructure utilized in conjunction with the structure set forth in FIGS. 2B-2D.

In accordance with an embodiment of the present invention, an adaptive structure may be associated with a pore 116 and utilized to control the flow of the coolant 110 therethrough. For example, as shown in FIG. 2E, the adaptive structure 118 may be used to limit the flow of coolant 110 through an associated pore 116 in an adaptive manner responsive to, for example a temperature sensed by the adaptive structure 118. Thus, adaptive structure 118 may be said to "sense" the surrounding temperature, even in the absence of a dedicated sensor element. In one embodiment, the adaptive structure 118 may include an actuator or microstructure (a structure formed at the microscale). The actuator may include a flap or a beam 120 formed of a desired material and exhibiting a desired shape such that, in reaction to an increase in temperature, and as indicated by a dashed line, the beam 120 deflects away from the opening 122 of its associated pore 116 (e.g., due to thermal expansion of the beam 120 or a portion thereof), enabling the flow rate of coolant 110 through the pore 116 to increase. Upon a decrease in temperature, the beam 120 may deflect back toward the opening 122 of the pore 116, again changing the flow rate of coolant through the pore 116.

The beam 120 may be configured to deflect, or be displaced, upon sensing of one or more threshold temperatures to provide a flow rate of coolant 110 that is adequate to transfer a desired amount of heat away from the structure (e.g., the engine wall 102) and maintain the structure within a specified temperature range. Moreover, not only may the beam 120 be configured to be actuated at a desired temperature (or within a desired temperature range), but the beam 120 may also be configured to be displaced in accordance with a desired relationship with the temperature variation of the structure (e.g., the engine wall 102). For example, the beam 120 may be configured to exhibit a linear or a nonlinear displacement relationship with the temperature variation of the associated structure depending on specific cooling needs. Such tailoring of the flap or the beam 120 may be accomplished, for example, by tailoring the geometric configuration of the flap or the beam 120, by tailoring the material from which the flap or the beam 120 is formed, through the manner in which the flap or the beam 120 is coupled to an underlying material, or a combination of such techniques.

A plurality of such adaptive structures 118 formed in association with the skin panel 114 provides a self-regulating thermal management system and results in more efficient thermal management of a structure that exhibits, for example, a highly transient thermal profile. Such a thermal management system generally behaves similar to the human skin, and more particularly to the sweat gland, when it responds to a thermal stimulus by providing a tailored amount of cooling in a localized area based on need. In the case of the adaptive structure 118 or other embodiments of the present invention, the flow of coolant is automatically adjusted in response to an external flow-field heat flux.

Thus, a structure needing thermal management may have one or more surfaces covered with large arrays of adaptive structures 118 or other self-regulating coolant pores that control the flow rate of coolant for film, transpiration, or wall cooling. Each pore 116, or sub-array of pores 116, may independently control the flow rate of coolant 110 passing therethrough such that coolant flow rates vary with the thermal load to maintain the temperature of the structure within a desired operational range. Moreover, such adaptive structures 118, because they are formed at the micron scale, introduce very minimal flow disturbance while saving considerable weight and providing fast response times as compared to conventional thermal management systems.

Figure 1:
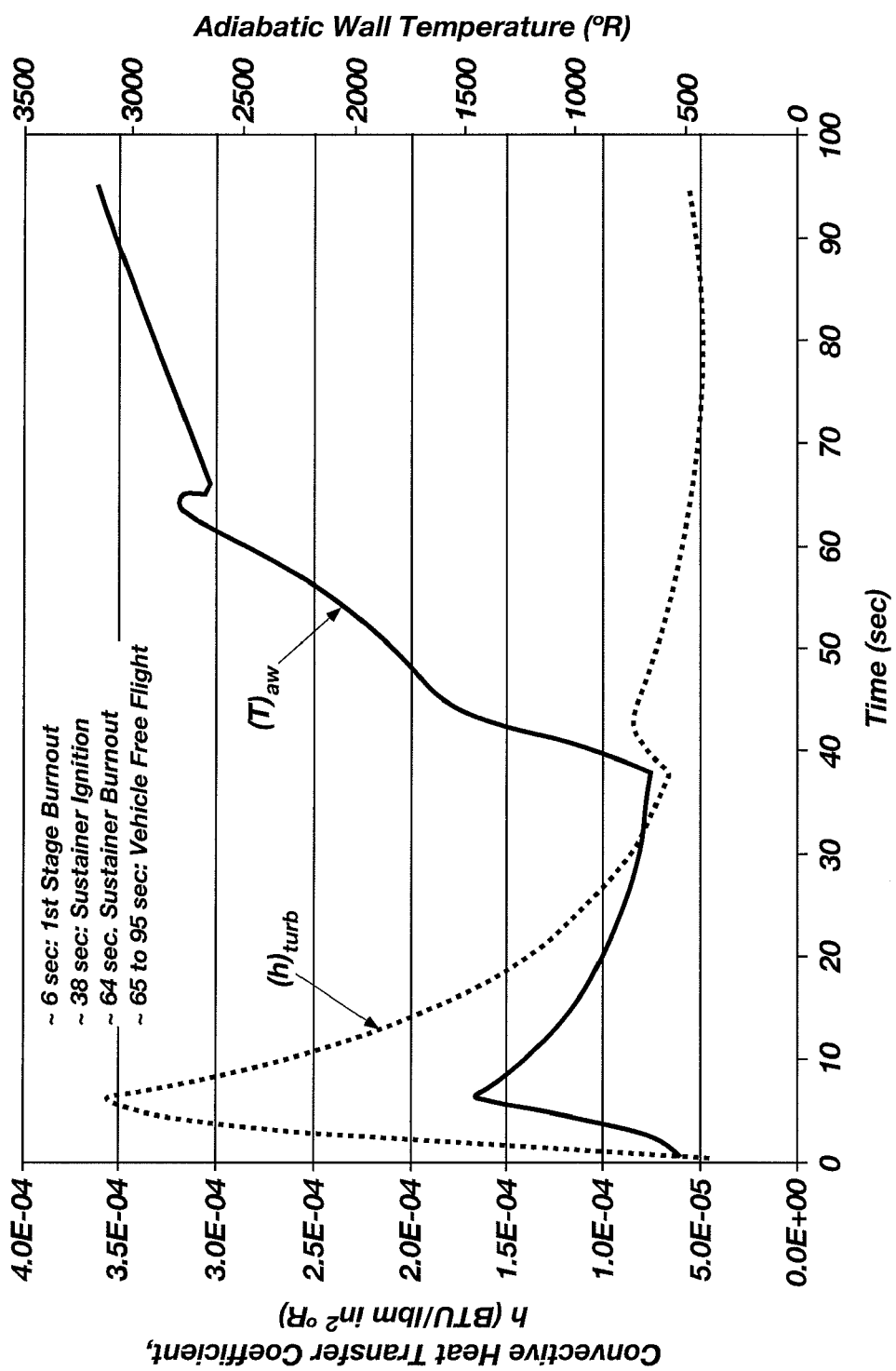
FIG. 1 is a graph related to heating issues and thermal management of an aerospace vehicle.

Referring briefly back to FIG. 1, if a conventional thermal management system were designed for the highest heat flux expected throughout a hypersonic vehicle mission (e.g., at approximately 6 seconds in FIG. 1), it is believed that the resulting total heat load integrated over the 95 second mission would be overestimated by approximately 74%. A thermal management system configured with adaptive structures in accordance with one or more embodiments of the present invention would enable an aerospace vehicle to significantly reduce the amount of fuel required for cooling due to the use of coolant as needed, rather than based on conservative design parameters.

Referring back to FIGS. 2A-2E, the self-regulating skin panel 114, including the adaptive structures 118, may be fabricated using microfabrication processes utilized in the semiconductor and microelectromechanical systems (MEMS) industries as will be appreciated by those of ordinary skill in the art. Such processes may include, for example, film deposition, lithographic patterning, and etching to create planar arrays of devices or adaptive structures having micron (or micrometer) scale features on or through, for example, a Si or SiC substrate. The skin panels 114 may be mounted to coolant distribution webs, which may be integrally formed with the structure that is being cooled (e.g., the engine wall 102) such as, for example, through fusion bonding, brazing, or glass bead fusing.

As will be appreciated by those of ordinary skill in the art, MEMS technology allows the integration of a sensor, an actuator, and electronics on an area smaller than the size of a pupil. The use of MEMS or semiconductor fabrication processes to provide adaptive structures in accordance various embodiments of the present invention provides various advantages. For example, batch fabrication at large volumes conventionally results in cost reduction. Additionally, as previously noted, the small structure or device size that is produced provides weight savings, localized response, minimal flow disturbance and rapid response. Moreover, the use of such structures or devices provides significant redundancy since thousands of MEMS or MEMS-like structures can be fabricated on a single chip having a surface area of only 1 mm×1 mm. Additionally, such structures and devices consume very little power. Indeed, in certain embodiments, wherein the material properties of the beam 120 of the adaptive structure 118, no power is consumed by operation of such structures or devices. Various other advantages are offered by use of microscaled structures and devices as will be apparent to those of ordinary skill in the art.

Figure 2F:
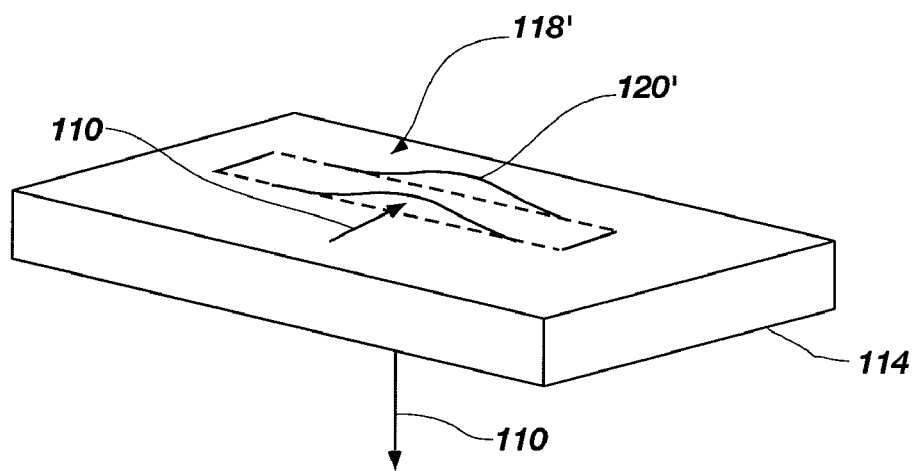
FIG. 2F shows a perspective view of another microstructure in accordance with another embodiment of the present invention.

Referring briefly to FIG. 2F, a perspective view of another adaptive structure 118' is shown. The adaptive structure 118' includes an actuator in the form of an elongated slender beam 120' that, rather than being free at one end (or cantilevered at a single end thereof), is constrained at both ends, causing the beam to buckle in the middle upon actuation thereof. Thus, when in a nonactuated state, such as when the temperature of an associated structure is below a threshold temperature, the actuator or beam 120' remains in an unactuated state (as shown in dashed lines) to prevent, or at least limit, the flow of coolant 110 through an associated pore (not shown in FIG. 2F). When actuated, the actuator or beam 120' buckles such that the central portion thereof deflects away from the skin panel 114 to increase the flow rate of coolant through the pore. It is additionally noted that, in the embodiment shown in FIG. 2F, the actuator or beam 120' is not located on the surface of the skin panel 114 that is exposed to the heat source, but is located on an opposing side thereof.

Figure 2G:
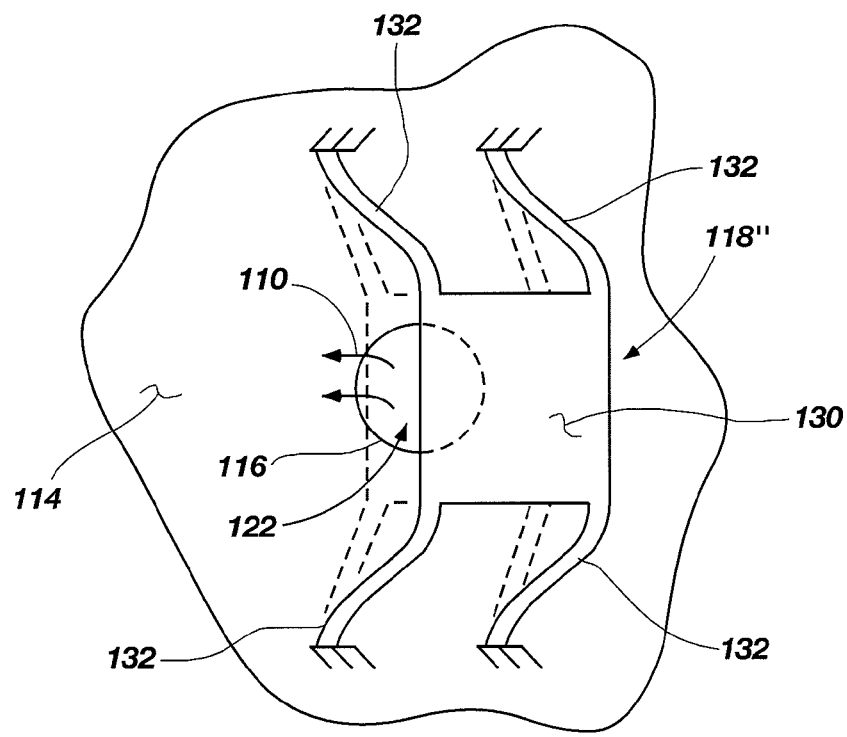
FIG. 2G shows a plan view of yet another microstructure in accordance with a further embodiment of the present invention.

Referring now to FIG. 2G, a plan view is shown of another adaptive structure 118" that is formed at the microscale. The adaptive structure 118" includes beam having a main body portion 130 sized and configured to cover, or at least substantially cover, the opening 122 of an associated pore 116. One or more lateral displacement members 132 are coupled with the main body portion 130 and attached to, or otherwise integrated with, the skin panel 114. The displacement members 132 may be appendages from the main body portion 130 and substantially integrally formed therewith, or they may be coupled to the main body portion 130 by some other means.

When the structure (e.g., engine wall 102 (FIG. 2A)) to which the adaptive structure is attached exhibits a temperature below a threshold level, the displacement members 132 remain in a first, nonactuated position (shown in dashed lines) such that the main body portion covers, or at least partially covers, the opening 122 of the pore 116 to prevent or limit flow of coolant 110 therefrom. Upon reaching or exceeding a threshold temperature, the displacement members 132 deflect laterally relative to the pore 116 to expose a larger area of the opening 122 and increase the flow rate of the coolant 110. It is noted that the adaptive structure 118" deflects laterally (i.e., in a direction that is generally parallel with respect to a surface of skin panel 114 with which the adaptive structure 118" is associated). This is in contrast to the embodiment previously described wherein the beam 120 is displaced away from or toward the surface of the skin panel 114.

Figure 2H:
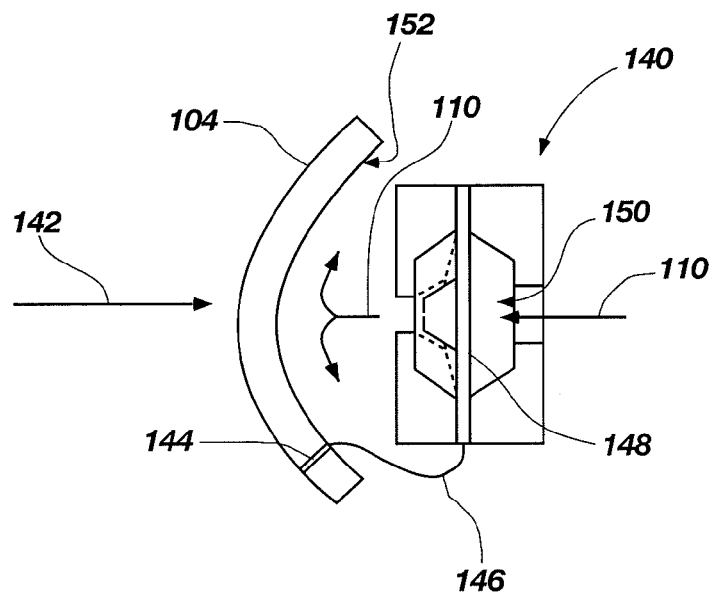
FIG. 2H shows an enlarged cross-sectional view of another portion of the structure shown in FIG. 2B including yet another microstructure in accordance with another embodiment of the present invention.

Referring now to FIG. 2H, an enlarged portion of air foil 104 is shown which incorporates an adaptive structure 140 in accordance with yet another embodiment of the present invention. While the previously described embodiments included adaptive structures that could, if desired, be exposed to a flow path (such as an air flow path within a portion of an engine), it may be desirable at times to provide cooling in a manner such that the coolant does not enter into such a flow path and such that the adaptive structure is likewise not exposed to such a flow path. One example of such a cooling technique includes impingement cooling or wall cooling wherein coolant is sprayed against (or otherwise contacts) a backside or a surface of the structure that is relatively remote from the source of heat to which the structure is exposed.

For example, the leading edge of structure such as an air foil 104 tends to experience significant temperature increases in high-speed aerospace vehicles. In some instances, it may be desirable to cool the air foil 104, or portions thereof, without exposing the adaptive structure 140 or other components to the air stream 142, which is passing over the air foil 104. Thus, a thermocouple 144 or other device may be embedded in or otherwise be associated with a portion of the air foil 104 to sense a change in temperature experienced by the air foil 104 at a particular location. Due to the thermoelectric effect employed by the thermocouple (generally the effect of converting a temperature differential to an electrical voltage and vice versa, as will be appreciated by those of ordinary skill in the art), an electrical voltage may be established via an electrical conductor 146 to actuate a beam 148 or other displaceable component of the adaptive structure 140.

The beam 148 may be disposed within a coolant flow path 150 such that, prior to actuation (such as shown by dashed lines) the beam 148 or a portion thereof prevents, or at least limits, the flow of coolant 110 that is to impinge upon the back surface 152 of the air foil 104 or other structure. Upon application of the voltage from the thermocouple 144, the beam 148 is displaced (such as indicated by solid lines) such that the flow rate of coolant 110 is increased.

In one embodiment, the displaceable component or beam 148 may be formed from a shape memory alloy (SMA). In one particular embodiment, the displaceable component or beam 148 may be formed of an SMA material including nickel and titanium. One more specific example includes a material commercially known as Nitinol, which includes approximately 55% nickel by weight and approximately 45% titanium by weight. As discussed in further detail below, the SMA is a material that is deformed and then, when heated, returns to its original form or shape.

It is noted that, because various components of the adaptive structure 140 are not exposed to, for example, the flow path of the air stream 142 or some other harsh environment, that a wider range of materials may be considered for use in providing and operating the adaptive structure 140.

Functionally, the adaptive structure 140 can be viewed as a combination of a sensor, an actuator, and a control subsystem. Using MEMS technology, these functions may be integrated on a chip to provide autonomous, local thermal management. As already mentioned, numerous approaches are possible to implement such a device or adaptive structure for sensing, actuation, and control.

For film and transpiration cooling, the adaptive structure may often be exposed to harsh environments and, therefore, traditional electronic circuitry may not be desirable or feasible if the adaptive structure were to be directly collocated with the sensor and actuator device. Instead, a thermomechanical control approach may be used (i.e., without electronics) such as has been described with particular reference to FIGS. 2E and 2F. For example, a local increase in wall temperature will lead to a mechanical deformation (via thermal expansion), which in turn affects the coolant flow rate. Not using analog or digital electronics may limit the control algorithms to the simplest strategies, such as proportional control. However, the thermomechanical implementation can be extremely simple, reliable, completely autonomous, require no external wiring, and be suitable for use in high temperature environments.

Multiple sensing and actuation approaches are contemplated in conjunction with embodiments of the present invention. For example, as already described, differential thermal expansion may be used as a mechanical actuation and control mechanism. In such a case, thermal expansion, due to temperature gradients, results in non-uniform expansion of the adaptive structure (or actuating component thereof). Such a mechanism may be implemented using SiC and used in high temperature environments. Additionally, such an approach enables the adaptive structure to exhibit a substantially linear response. It is noted, however, the differential expansion conventionally results in rather small deflections and such a mechanism is rather sensitive to temperature distributions.

Bimorph thermal expansion is similar to differential thermal expansion, but utilizes multiple materials having different thermal expansion coefficients so as to induce non-uniform deformation. Deflections of a larger magnitude, as compared to differential expansion, are possible using bimorph expansion and such a mechanism is less sensitive to temperature distribution. However, response of bimorph structures is moderately nonlinear and construction of a structure based on bimorph expansion is more involved because it inherently requires the use of two high temperature materials (e.g., two different metallic materials).

Shape memory alloys, briefly discussed hereinabove, are unique materials that undergo a material property phase transformation in their crystal structure that is temperature dependent. This phase transformation is responsible for the shape memory and superelastic properties of these alloys. These metallic materials possess the ability to return to some previously defined shape or size when subjected to certain temperature characteristics. SMAs can be plastically deformed at some relatively low temperature and can then be returned to their original shape once exposed to some higher temperature. When the SMA is heated above its transformation temperature, it can recover a preset shape and size; upon cooling, the SMA returns to an alternate shape.

Considering the above example of NiTi, the transformation temperature for NiTi (or Nitinol) ranges from 30° F. to 250° F. and can occur either by direct heat or by applying an electric current that generates heat (ohmic heating). Thin film NiTi can also be superelastic and, in a certain state, behaves like rubber in that it is capable of attaining extreme angles and may be deformed into small shapes. In its opposite state, the NiTi material resorts to a different shape and is very rigid. NiTi is very flexible and possesses the largest energy density of any active material, generating a large force during the shape changing process.

Relatively large deflections are possible using SMAs (as compared to the differential expansion and the bimorph expansion mechanisms) and temperature distribution is less critical. However, operating temperatures may be limited when using SMAs and, furthermore, structures formed of SMAs tend to exhibit a highly nonlinear response.

With regard to sensing approaches, examples include direct thermal sensing, conductive thermal sensing and thermoelectric approaches. Direct thermal sensing includes exposing the adaptive structure, or at least the actuator component thereof, directly to the heat source (e.g., hot gases). Such an approach provides relative certainty in the results of the sensing. However, direct sensing, depending on the environment in which the sensor is exposed, may require the use of high temperature materials in the adaptive structure. The terms "sense," "sensing," and variants thereof are used herein in a nonlimiting manner, to indicate the passive or active recognition by an element or feature or a combination of elements or features of an adaptive structure, of one or more stimuli in the form of variations in selected parameters such as, for example, temperature, such recognition being usable to initiate or vary a response by the adaptive structure.

Conductive thermal sensing includes sensing heat that is conducted from a surface of the structure being cooled to the actuator or sensor of the adaptive structure. While there is relatively less certainty in sensing the actual temperature, such an approach enables the adaptive structure to operate at a relatively lower temperature.

Thermoelectric sensing includes sensing the temperature of a structure, for example, at or near a surface that is exposed to the heat source using a thermocouple or similar device to establish an electric potential. Such an approach enables the sensing to take place relatively remotely from the actuating component (e.g., the displaceable member) of the adaptive structure, but it may also limit operating temperatures to some degree.

While the various embodiments described herein have generally been discussed in the context of providing a thermal management system for a high-speed aerospace vehicle, it is noted that the present invention, including the various embodiments of adaptive structures, may be utilized in a number of different contexts and applications.

Embodiments of the present invention may be used in numerous other thermal management applications including, for example, gas turbine cooling, nuclear reactors, combustors, heat exchangers, rocket engines, or even cooling of electronic components such as microchips.

Embodiments of the present invention may also be used for in applications other than thermal management systems. For example, various types of flow controls may be managed by embodiments of the present invention. One example includes control of impulse thrust of, for example, a missile or rocket, enabling directional thrust to be effected through a desired surface of the missile or rocket and providing the rocket or missile with a high degree of maneuverability.

Other embodiments of the present invention may include positioning adaptive structures having, for example, flaps as an actuating device on an air foil. At certain times during flight, it may become desirable to perturb the boundary layer about the air foil. Such adaptive structures may be used to effect such a perturbation.

In yet another embodiment, such adaptive microstructures may be utilized in sensing flow separation about an air foil and responding to such flow separation in a desired manner.

EXAMPLE

Considering a long slender beam as an actuation device in an adaptive structure, a long slender beam in compression will exhibit a lateral deflection as the loading approaches a critical value and the beam becomes unstable. A beam with a perfectly symmetric cross section will buckle in a discontinuous manner at the critical load. A perfectly symmetric cross section, however, is a theoretical approximation. In reality, a compressive member will have some imperfection or asymmetry that leads to a continuous nonlinear deflection. Accordingly, the buckling of compressed beams with a designed eccentricity has been investigated, focusing on the regime of small eccentricity ratios, $e/h \rightarrow 0$ (e being the eccentricity or offset and h being the thickness of the beam), for the specific geometry shown in FIGS. 3A and 3B.

The Elastic Curve and the Secant Formulation

An elastic analysis of clamped-clamped beams under thermal loading was carried out with the assumption of small curvatures. Due to symmetry, a clamped-clamped beam of length 2L buckling under a compressive force can be analyzed as a pinned-pinned beam of length L under the same loading.

Figure 4A:
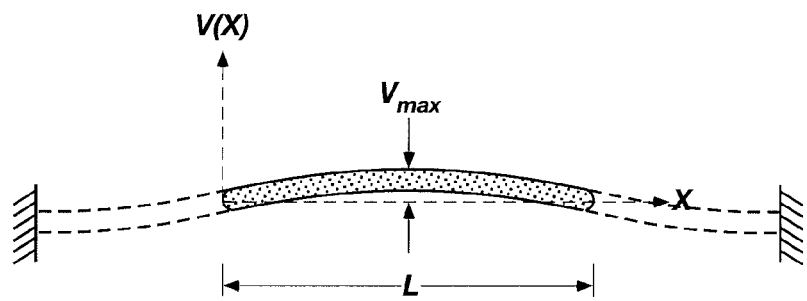
FIGS. 4A and 4B show side views of a pinned-pinned simplification of a clamped-clamped buckling problem, showing pinned deflection v(x) in FIG. 4A and clamped deflection d(x) in FIG. 4B.
Figure 4B:
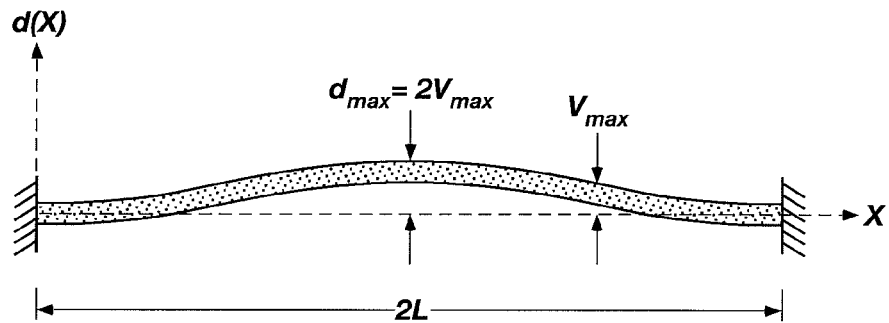

The pinned ends correspond to inflection points in the clamped beam, where the internal moment is null. The resulting deflections can be extended accordingly to the clamped-clamped case as shown in FIGS. 4A and 4B.

Figure 3A:
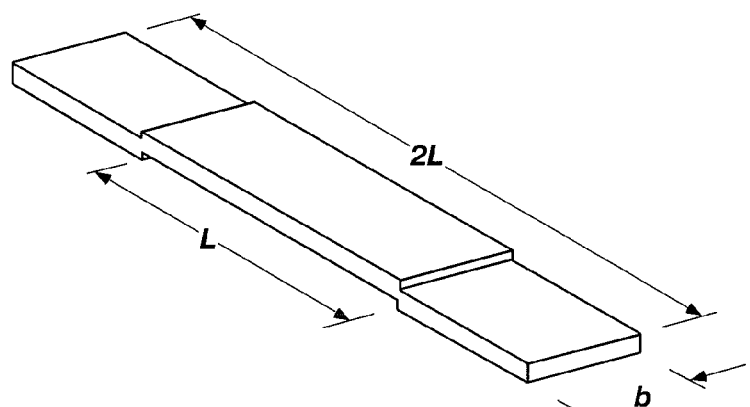
FIGS. 3A and 3B show a perspective view and a side view, respectively, of a clamped-clamped beam with an eccentricity.
Figure 3B:
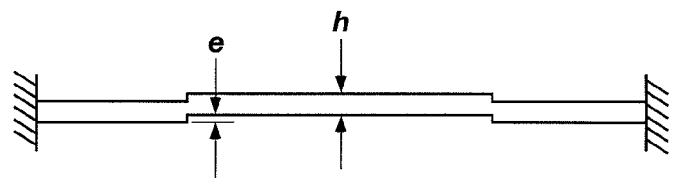

The clamped eccentric beam in FIGS. 3A and 3B can also be simplified as a pinned beam; in this case, the inflection points of the beam coincide with the eccentricity locations. More specifically, the point of zero moment in the beams is located at half the eccentric height, e/2. The resultant loading and deflection of the beam is, therefore, symmetric about this point. Using this simplification, the elastic curve and the state of stress have been analyzed.

Figure 5A:
FIGS. 5A and 5B illustrate equivalent loadings of pinned-pinned beams.
Figure 5B:

The pinned beam-column with a compressive load, P, applied at an eccentric distance, e/2, is statically equivalent to an axially loaded beam with an additional moment, $M_0 = Pe/2$, applied at the end points as shown in FIGS. 5A and 5B.

Assuming shallow beam curvatures but considering the moment induced by lateral deflection of the beam, the elastic curve for the beam is given as:

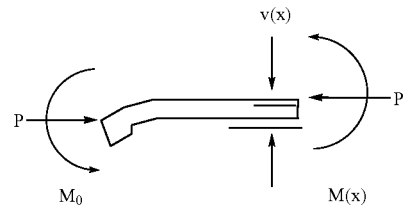

$$EI\frac{d^2 v}{dx^2} = M(x) = -M_0 - Pv = -P\left(\frac{e}{2} + v\right) \quad (1)$$

where v is the pinned-pinned deflection, I is the beam moment of inertia and E is the modulus of elasticity. The resultant problem becomes:

$$\frac{d^2 v}{dx^2} + \left(\frac{P}{EI}\right)v = -\frac{Pe}{2EI} \quad (2)$$

$$v(0) = v(L) = 0$$

which has the following solution:

$$v(x) = \frac{e}{2}\left[\tan\left(\frac{L}{2}\sqrt{\frac{P}{EI}}\right)\sin\left(\sqrt{\frac{P}{EI}}\,x\right) + \cos\left(\sqrt{\frac{P}{EI}}\,x\right) - 1\right] \quad (3)$$

As seen in FIGS. 4A and 4B, the central deflection of the associated clamped-clamped problem, d, is twice that of the central deflection of the pinned-pinned problem, $v(x=L/2)$, hence:

$$d = 2v(x = L/2) = e\left[\sec\left(\frac{L}{2}\sqrt{\frac{P}{EI}}\right) - 1\right] \quad (4)$$

Maximum Stress

A buckled beam under compressive loading is subjected to both axial and bending stress, the maximum of which is compressive and located at the midpoint on the lower surface of the beam, as drawn in FIGS. 4A and 4B. The maximum stress can be written as the sum of these two components:

$$\sigma_M = \sigma_A + \sigma_B = \frac{P}{bh} + \frac{h}{2I}|M(x = L/2)| \quad (5)$$

Using the magnitude of the internal moment at the midpoint, as given by Eq. (1):

$$|M(x = L/2)| = P\left(\frac{e}{2} + v(x = L/2)\right) = \left(\frac{Pe}{2}\right)\sec\left(\frac{L}{2}\sqrt{P/EI}\right) \quad (6)$$

yields the maximum stress in the buckled beam:

$$\sigma_M = \frac{P}{bh}\left[1 + 3(e/h)\sec\left(\frac{L}{2}\sqrt{P/EI}\right)\right] \quad (7)$$

Equations (4) and (7) define the beam central deflection and maximum stress as a function of axial load. An additional relation is needed to relate the axial force, P, to the average beam temperature rise, $\Delta T$.

Stress-Strain-Temperature Relationship

Consider the stress-strain relationship of a heated beam restrained from expansion in the axial direction:

$$\sigma_A = \frac{P}{bh} = E[\alpha \Delta T - \varepsilon'] \quad (8)$$

Here $\alpha$ is the difference in the coefficient of thermal expansion between the beam and the substrate, $\Delta T$ is the average temperature rise of the beam, $\sigma_A$ is the axial stress and $\varepsilon'$ is the strain due to beam elongation:

$$\varepsilon' = \frac{l - L}{L} \quad (9)$$

where l is defined as the deformed beam length, which is given by:

$$l = \int_0^L \sqrt{1 + (dv/dx)^2}\, dx \quad (10)$$

The assumption of shallow beam curvatures, which can be written as dv/dx<<1, has already been asserted previously in this analysis. Accordingly, the integrand in Eq. (10) can be simplified to:

$$\sqrt{1 + (dv/dx)^2} \cong 1 + \frac{1}{2}(dv/dx)^2 \quad (11)$$

and the strain term in Eq. (8) can, therefore, be rewritten as:

$$\varepsilon' \cong \frac{1}{2L}\int_0^L (dv/dx)^2 dx \quad (12)$$

Knowing v(x) from Eq. (3), both the derivative and integral in Eq. (12) can be evaluated. Dropping the approximate equality, combining Eq. (8) and Eq. (12) and rearranging terms gives:

$$\Delta T = \frac{P}{\alpha E b h}\left[1 + \frac{3}{4}(e/h)^2\right. \quad (13)$$

$$\left\{\frac{\tan\left(\frac{L}{2}\sqrt{P/EI}\right)\cos(2L\sqrt{P/EI})}{L\sqrt{P/EI}} + \tan^2\left(\frac{L}{2}\sqrt{P/EI}\right)\left[1 + \right.\right.$$

$$\left.\left.\frac{\sin(2L\sqrt{P/EI})}{2L\sqrt{P/EI}}\right] + \left[1 - \frac{\sin(2L\sqrt{P/EI})}{2L\sqrt{P/EI}}\right]\right\}\right]$$

which defines the relationship between applied axial load and average temperature rise of the beam.

Nondimensional Design Curves

Collectively, Eq. (4), (7) and (13) fully describe the thermomechanical behavior of doubly clamped eccentric beams. For convenience, several nondimensional parameters can be defined to simplify these equations. Recalling the definition of the critical load, $P_{cr}$, as the force at which a theoretically perfect beam (e=0) will buckle:

$$P_{cr} = \frac{\pi^2 EI}{L^2} = \frac{\pi^2 E b h^3}{12L^2} \quad (14)$$

a Critical Temperature Rise, $\Delta T_{cr}$, can be defined by evaluating Eq. (8) at the critical load, noting that for a perfect beam prior to buckling, there is no deflection and, therefore, no associated strain term, $\varepsilon'$:

$$\Delta T_{cr} = \frac{P_{cr}}{\alpha E b h} = \frac{1}{12\alpha}\left(\frac{\pi h}{L}\right)^2 \quad (15)$$

Utilizing Eq. (14) and (15) and by simple examination of Eq. (4), (7) and (13), nondimensional forms of deflection ($\delta$), eccentricity ($\epsilon$), axial load ($\eta$), maximum compressive stress ($\Sigma$) and temperature rise ($\theta$) have been defined respectively as:

$$\delta = d/h \quad (16)\text{-}(20)$$
$$\varepsilon = e/h$$

-continued $$\eta = \frac{\pi}{2}\sqrt{P/P_{cr}} = \frac{L}{2}\sqrt{P/EI}$$

$$\Sigma = \frac{\sigma_M}{E}\left(\frac{L}{h}\right)^2$$

$$\theta = \frac{\Delta T}{\Delta T_{cr}} = 12\alpha\Delta T\left(\frac{L}{\pi h}\right)^2$$

Nondimensional forms of the main relations Eq. (4), (7) and (13) are obtained by rearranging and substituting in Eq. (16)-(20):

$$\delta = \varepsilon[\sec\eta - 1] \quad (21)$$

$$\Sigma = \eta^2[(1/3) + \varepsilon\sec\eta] \quad (22)$$

$$\theta = \left(\frac{2\eta}{\pi}\right)^2\left[1 + \frac{3}{4}\varepsilon^2\left\{\frac{\tan\eta\cos 4\eta}{2\eta} + \tan^2\eta\left(1 + \frac{\sin 4\eta}{4\eta}\right) + \left(1 - \frac{\sin 4\eta}{4\eta}\right)\right\}\right] \quad (23)$$

Figure 7:
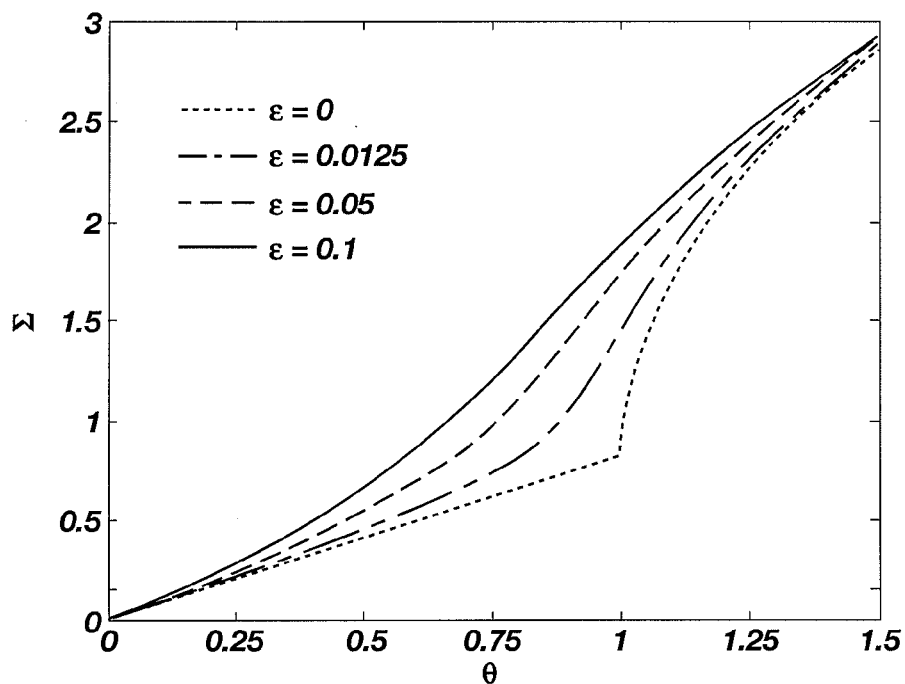
FIG. 7 shows nondimensional design curves for stress, $\Sigma=(\sigma_M/E)(L/h)^2$, as a function of temperature rise, $\theta=12\alpha\Delta T(L/\pi h)^2$, for various eccentricities, $\epsilon=e/h$.
Figure 8:
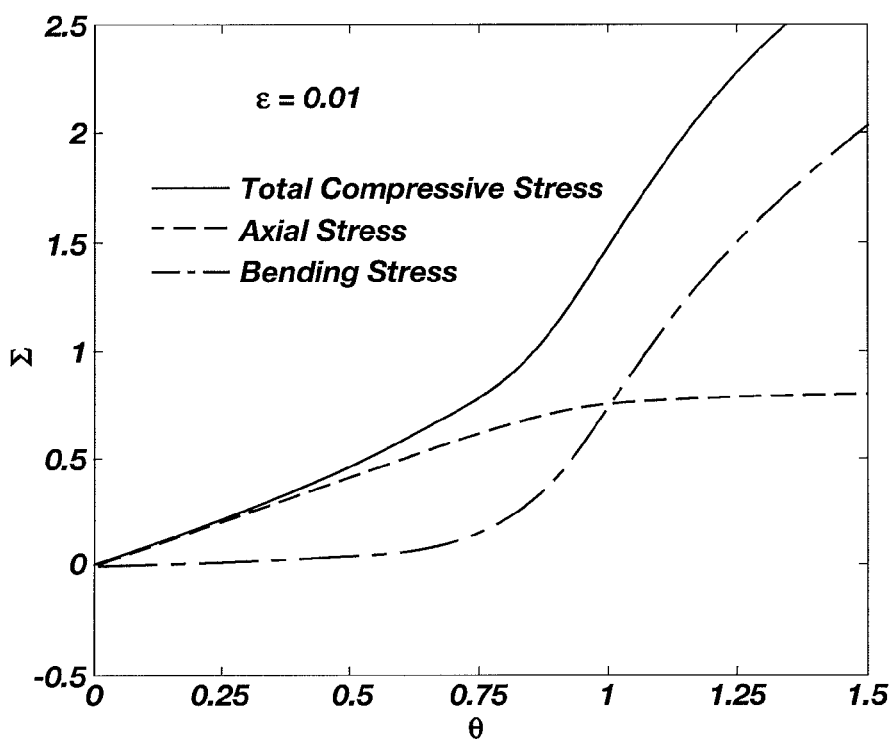
FIG. 8 shows nondimensional stress components for a beam.
Figure 11A:
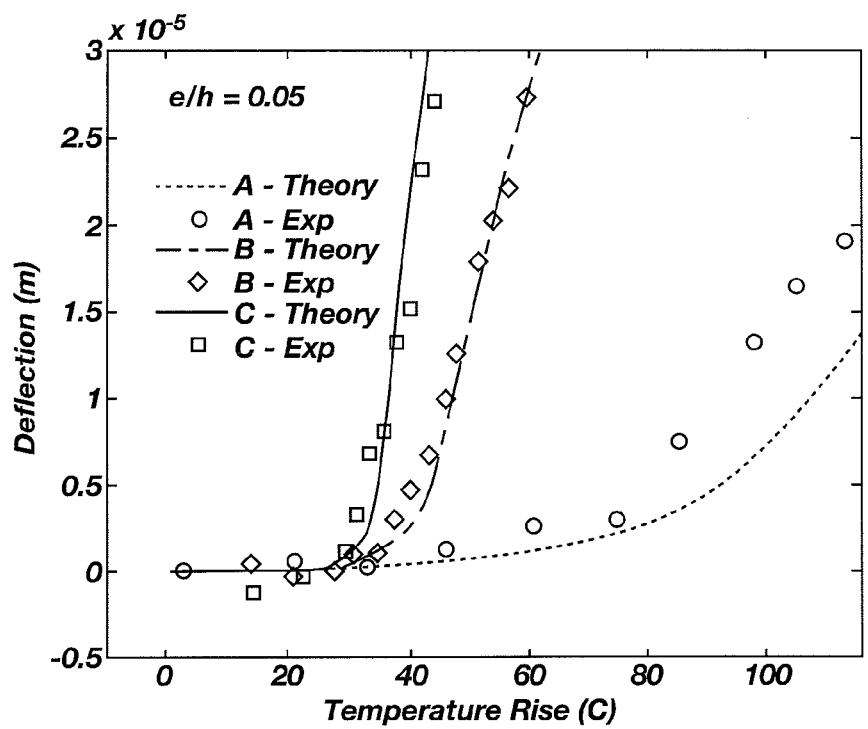
FIGS. 11A and 11B show central deflection versus temperature rise results for the various beam geometries plotted against the theoretical predictions for (a) e/h=0.05 and (b) e/h=0.0125.
Figure 11B:
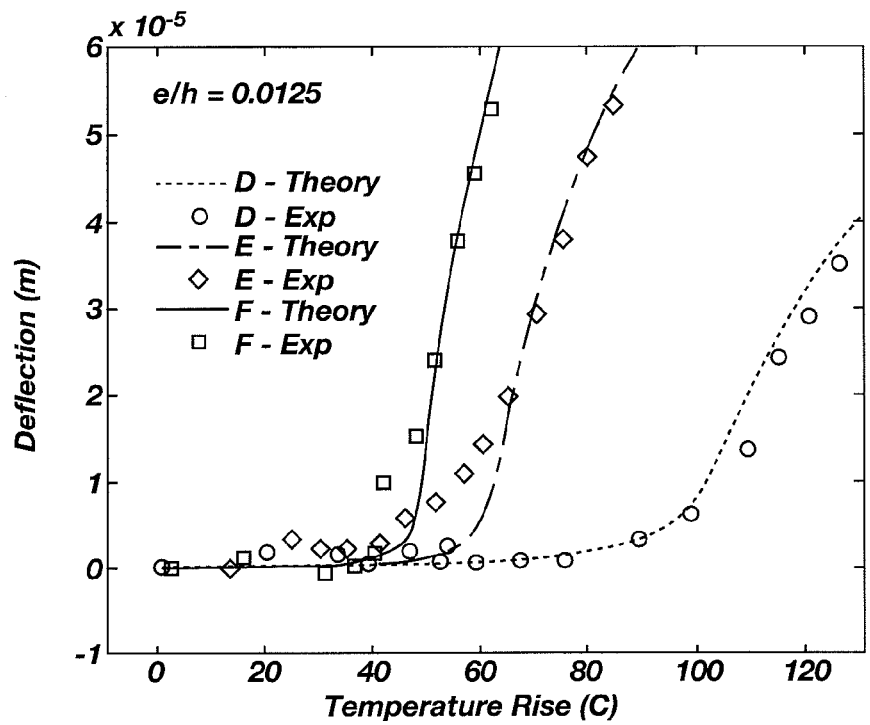

This set of nondimensional equations was solved numerically using MATLAB® to eliminate the nondimensional axial load, $\eta$. Curves for central beam deflection, $\delta$, maximum compressive stress, $\Sigma$, and its corresponding stress components are shown in FIGS. 6-8, respectively, as a functional of temperature rise, $\theta$.

At low temperature rises, $\theta \ll 1$, the beam behavior is dominated by axial compression; the beam deflection and stress increase linearly with $\theta$. At high temperatures, $\theta > 1$, bending begins to be appreciable, leading to large deflections and, therefore, large strain. In this range, the strain term dominates, limiting the beam to finite deflections. At intermediate temperatures between these two regions, $0.5 < \theta < 1$, the shape of the deflection and stress curves are more sensitive to $\varepsilon$ and can exhibit very nonlinear behavior as seen in FIG. 6 and FIG. 7.

Figure 6:
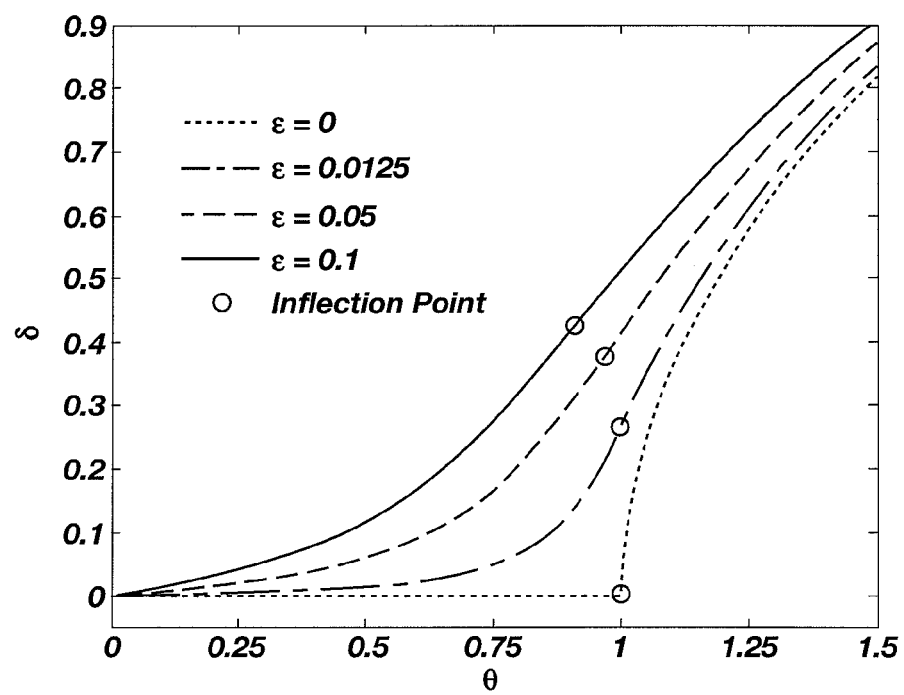
FIG. 6 shows nondimensional design curves for deflection, $\delta=d/h$, as a function of temperature rise, $\theta=12\ \alpha\Delta T(L/\pi h)^2$, for various eccentricities, $\epsilon=e/h$.

The curves of deflection as a function of temperature rise shown in FIG. 6 pass through an inflection point, denoted here by a circle. This is the point of maximum slope and the boundary between positive and negative concavity of the temperature-induced deflection. This makes the inflection point a design parameter of interest for implementing buckled beams into adaptive structures such as thermally actuated MEMS devices. Accordingly, the location of this point at various eccentricities has been solved numerically utilizing MATLAB®.

First, let $\delta^*$ and $\theta^*$ define, respectively, the nondimensional deflection and temperature rise of the beam at the inflection point. Using this notation, the location of the inflection point has been solved and plotted as a function of eccentricity in FIG. 9.

FIGS. 6 and 9 show that for a perfectly symmetric beam, $\varepsilon = 0$, there is zero deflection ($\delta = 0$) up until buckling occurs at the critical temperature, $\theta = 1$. The inflection point is therefore at ($\delta^*$, $\theta^*$)=(0, 1). For imperfect beams, $\varepsilon \neq 0$, continuous nonlinear deflections are predicted and the point of maximum slope varies as shown in FIG. 9.

FIGS. 6, 7 and 9 provide succinct nondimensional design curves for the implementation of thermally actuated buckled beams in MEMS systems. These curves, along with the preceding analysis, capture the complex and highly nonlinear behavior exhibited in thermally buckled beams. The beam shape, central deflection and state of stress have all been modeled as they vary with temperature rise and eccentricity.

A beam such as shown in FIGS. 3A and 3B may be fabricated using semiconductor fabrication and MEMS fabrication processes as will be appreciated by those of ordinary skill in the art. More specifically, a process for fabricating such a beam was described in the provisional application from which the present application claims priority, the disclosure of which provisional application has been incorporated by reference herein.

Several 300 μm wide beams were fabricated corresponding to two different eccentricity ratios, e/h, and five different slenderness ratios, L/h. These beams were then measured and compared to the design curves presented earlier. Table 1 lists all the geometries fabricated for the presently described example while table 2 lists process conditions for nickel plating the fabricated beams.

TABLE 1

| Beam Geometries | | | |
|---|---|---|---|
| Beam | Length (L) | Thickness (h) | Eccentricity (e) |
| A | 1000 μm | 30 μm | 1.5 μm |
| B | 2000 μm | 30 μm | 1.5 μm |
| C | 3000 μm | 30 μm | 1.5 μm |
| D | 2000 μm | 60 μm | 0.75 μm |
| E | 3000 μm | 60 μm | 0.75 μm |
| F | 4000 μm+ | 60 μm | 0.75 μm |

Thickness, eccentricity and surface roughness measurements were taken using a profilometer. The surface roughness was $\leq 1$ μm, while the variation in thickness across a single beam was measured to be $\leq 2$ μm for the beams tested in this work.

The nickel electroplating process was optimized to create a deposition with both low tensile residual stress as well as high yield strength. The plating conditions used in this work, as listed in Table 2, resulted in a deposition rate of approximately 7 μm/hr.

TABLE 2

| Process conditions for nickel electroplating | | | |
|---|---|---|---|
| Composition | | Operating Conditions | |
| 500 g/L | Ni (SO$_3$NH$_2$)$_2$ | pH value | 4-4.5 |
| 30 g/L | H$_3$BO$_3$ | Temperature | 35° C. |
| 3 g/L | Laurel Sulfate | Cur. Dens. | 10 mA/cm$^2$ |
| with a sulfur activated anode & mechanical agitation | | | |

EXPERIMENTAL SETUP

The beam central deflection, d, was measured experimentally with an optical probe for the six microfabricated nickel beams listed in Table 1. The beam temperature was controlled using a thin film heater and a thermocouple. A schematic of the test setup 200 used is shown in FIGS. 10A and 10B which, generally, included an optical probe 202, a nickel beam on silicon 204, an aluminum plate 206, a thin film heater 208 and a thermocouple 210.

RESULTS AND DISCUSSION

The beam central deflection versus temperature rise is plotted against the theoretical predictions for all six beams. FIGS.

11A and 11B show graphs corresponding to the two eccentricity ratios considered in this work. Beams A, B and C were electroplated on the same wafer and have an eccentricity ratio of e/h=0.05. Similarly, beams D, E and F were fabricated together and have an eccentricity ratio of e/h=0.0125.

The theoretical results shown here are obtained by evaluating the nondimensional predictions for each beam's specific geometry and adjusting to account for the residual stress. The designed tensile residual stress in the beams will lead to an actuation temperature offset. A small rise in temperature will be required to overcome the tensile stress imparted during microfabrication. The resultant temperature offsets were used to determine the residual tensile stress in the nickel deposition for the two sets of beams fabricated. Beams A, B and C were offset by a temperature difference of approximately 27° C., while beams D, E and F were offset by a temperature difference of approximately 31° C. The corresponding residual tensile stresses are 54 Mpa and 62 Mpa, respectively, for the two sets. These stresses are in good agreement with the predicted values. A high purity bath of the composition and operating conditions used in this work has been reported to produce depositions with residual tensile stresses of 55 Mpa or less.

Accounting for the temperature offset caused by the residual tensile stress, the $\Delta T$ used in the calculation of $\theta$ in Eq. (20) can been defined as the temperature rise above the zero stress state, rather than ambient conditions. Accordingly the data for the three beams at a common eccentricity ratio, $\epsilon = e/h$, will collapse to a single nondimensional curve and can be compared against the predictions.

Figure 12A:
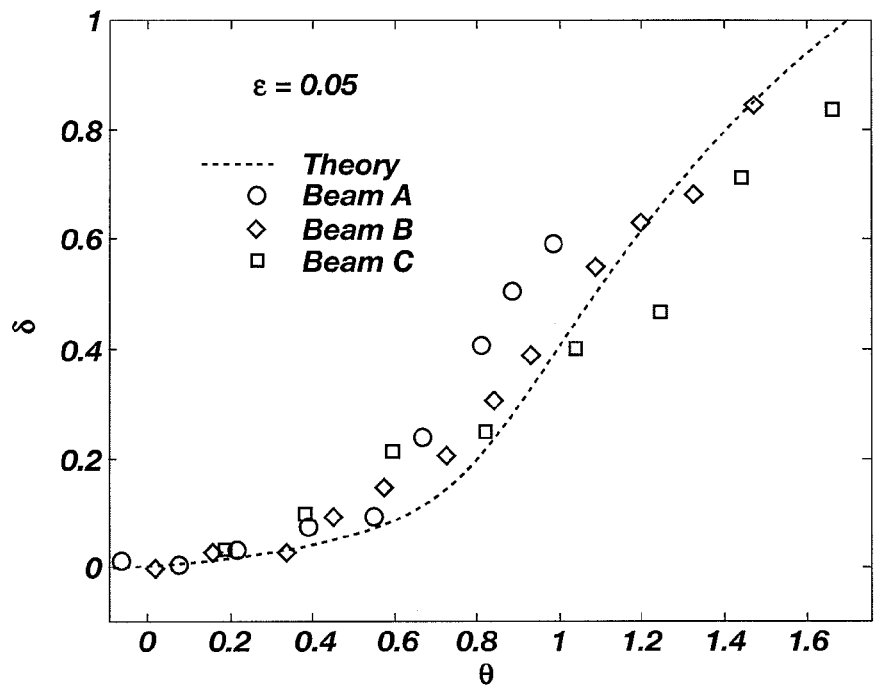
FIGS. 12A and 12B show nondimensional central deflection, $\delta$, versus nondimensional temperature rise, $\theta$, results for the various beam geometries plotted against the theoretical predictions for (a) $\epsilon$=0.05 and (b) $\epsilon$=0.0125.
Figure 12B:
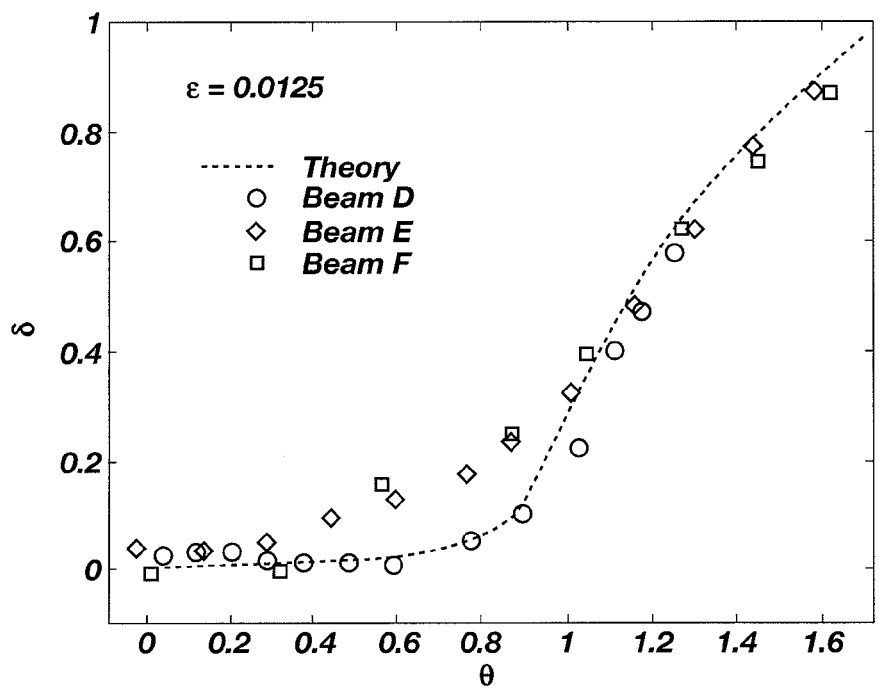

FIGS. 12A and 12B show relatively good agreement between the theoretical predictions and the measured deflections. When presented nondimensionally, the 30 μm beams (A, B and C) show a larger amount of scatter in the data than that of the 60 μm beams (D, E and F). This is explained by the sensitivity of the optical probe measurements; the thinner beams have smaller deflections leading to higher percent errors.

It can also be seen that the predictions are less accurate in the temperature range of $0.5<\theta<1$. As noted previously, the shape of the deflection curve in this region is very sensitive to the asymmetry of the beam, modeled in this work by the eccentricity ratio $\epsilon = e/h$. This would suggest that modeling of the beams with a designed imperfection, in the form of an eccentricity, has not completely captured the true imperfections of the beams tested. Two actual imperfections in the beams, the surface roughness and the thickness variation, were both measured to be on the order of the designed eccentricities. This seems to be a logical source of differences between the predictions and test results in this particular temperature range.

Hysteresis and Yield

The beams tested in the current work were scanned with a profilometer before and after thermal actuation to examine the onset and effect of plastic deformation. The central deflection of the beams after returning back to ambient conditions is listed in Table 3 along with the calculated maximum stress experienced by each beam.

A nickel electroplating bath of the composition and operating conditions used in this work has been reported to produce depositions with yield strengths of 400 Mpa to 600 Mpa. Table 3 shows the onset of an appreciable hysteresis effect occurring around 450 Mpa for the beams tested in this work.

TABLE 3

Permanent deflection due to plastic deformation and the corresponding calculated maximum stress for each beam geometry

| Beam | Permanent Deflection (μm) | Calculated Maximum Stress (Mpa) |
| --- | --- | --- |
| A | 1.25 | 400 |
| B | 1.00 | 150 |
| C | 0.50 | 75 |
| D | 10.25 | 450 |
| E | 4.00 | 250 |
| F | 2.00 | 150 |

Repeatability

Figure 13A:
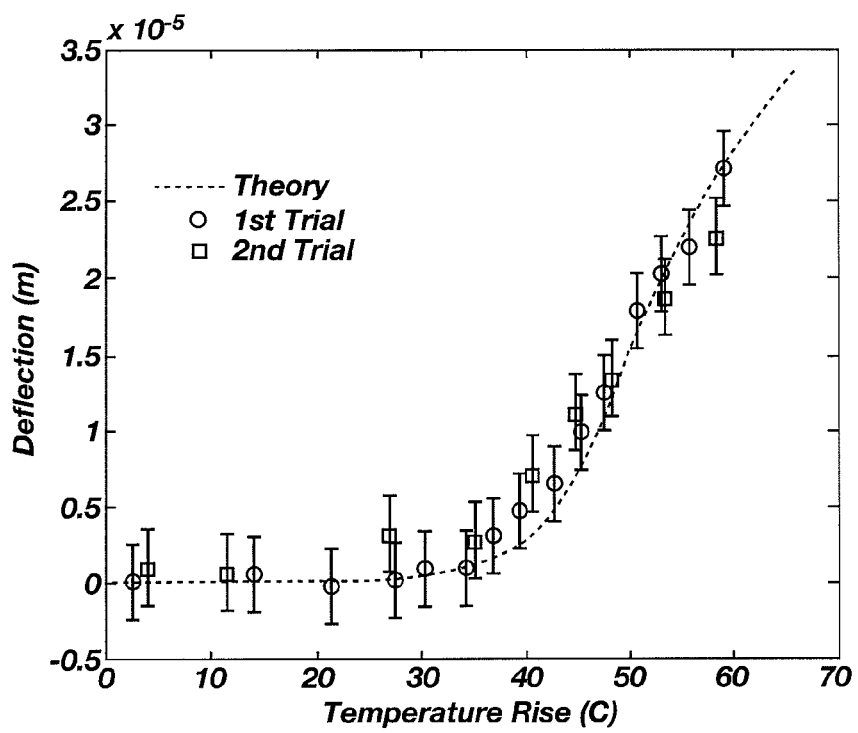
FIGS. 13A and 13B show repeatability of test results.
Figure 13B:
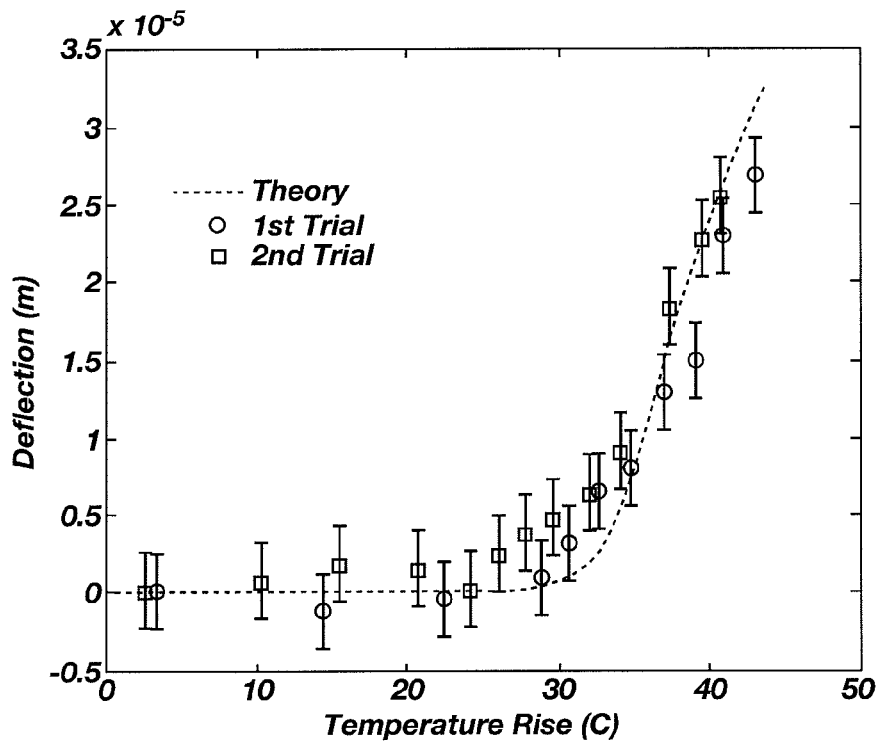

Two of the low stress beams exhibiting negligible hysteresis effects were additionally tested to examine the repeatability of the deflection measurements. FIGS. 13A and 13B show good repeatability of the test results for beams actuated with negligible plastic deformation.

NOMENCLATURE

E modulus of elasticity
I moment of inertia
L pinned-pinned length
M moment
P axial force
$\Delta T$ temperature rise
b beam width
d clamped-clamped central deflection
e eccentricity or offset
h beam thickness
l deformed beam length
v pinned-pinned lateral deflection
Greek
$\alpha$ difference in CTE of beam and substrate
$\delta$ nondimensional deflection, d/h
$\delta^*$ nondimensional deflection at the inflection point
$\epsilon$ nondimensional eccentricity, e/h
$\epsilon'$ strain
$\eta$ nondimensional axial force, $L/2\sqrt{P/EI}$
$\theta$ nondimensional temperature rise, $12\alpha\Delta T(L/\pi h)^2$
$\theta^*$ nondimensional temperature rise at the inflection point
$\sigma$ compressive stress
$\Sigma$ nondimensional maximum compressive stress, $$\frac{\sigma_M}{E}(L/h)^2$$

Subscripts
A axial
B bending
M maximum
cr critical

While the invention may be susceptible to various modifications and alternative forms, specific embodiments have been shown by way of example in the drawings and have been described in detail herein. However, it should be understood that the invention is not intended to be limited to the particular forms disclosed. For example, while the adaptive structure was described in various embodiments as including a beam, the beam may be configured to exhibit various shapes. Additionally, other configurations besides beams are contemplated. For example, a bellows microstructure may be utilized. Thus, the invention includes all modifications, equivalents, and alternatives falling within the spirit and scope of the invention as defined by the following appended claims.

What is claimed is:

1. A thermal management system comprising:
a source of fluid;
a skin panel having a first surface, a second surface and a plurality of micropores extending between the first surface and the second surface;
a flow path extending between the source of fluid and the plurality of micropores; and
a plurality of adaptive structures, wherein:
each adaptive structure of the plurality of adaptive structures is positioned on one of the first surface and the second surface and configured to independently alter a flow rate of fluid through a respective micropore of the plurality of micropores; and
each adaptive structure of the plurality of adaptive structures includes a displaceable actuator having a body portion and at least one appendage coupled between the body portion and the skin panel, wherein the at least one appendage is configured to displace the body portion in a direction that is substantially parallel to a major surface of the skin panel responsive to a change in temperature sensed by the at least one appendage.

2. The thermal management system of claim 1, wherein the source of fluid is a pressurized source of fluid.

3. The thermal management system of claim 1, wherein the source of fluid includes a fuel.

4. The thermal management system of claim 1, wherein the at least one appendage comprises a bimorph structure comprising at least two different metallic materials.

5. The thermal management system of claim 1, wherein the at least one appendage comprises a shape memory alloy (SMA).

6. The thermal management system of claim 5, wherein the SMA comprises titanium and nickel.

7. The thermal management system of claim 6, wherein the SMA comprises approximately 55% nickel by weight and approximately 45% titanium by weight.

8. The thermal management system of claim 1, wherein a portion of the adaptive structure is configured to be displaced away from the skin panel upon sensing a change in temperature.

9. The thermal management system of claim 8, wherein at least a portion of the body portion is configured to be displaced away from the skin panel upon sensing a change in temperature.

10. The thermal management system of claim 1, wherein each adaptive structure of the plurality of adaptive structures includes an actuator coupled with a thermocouple.

11. The thermal management system of claim 1, wherein the skin panel comprises a skin panel of a hypersonic vehicle.

12. An adaptive structure comprising:
a first structure having a first surface, a second surface, and at least one micropore extending between the first surface and the second surface; and
at least one microstructure including a microscale beam positioned on one of the first surface and the second surface of the first structure, the microscale beam having opposing ends coupled to the first structure and a middle portion positioned over the at least one micropore, the middle portion configured to be displaced relative to the first structure upon the adaptive structure being exposed to an external heat source.

13. The adaptive structure of claim 12, wherein the microsale beam includes a bimorph structure comprising at least two different metallic materials.

14. The adaptive structure of claim 12, wherein the microscale beam comprises a shape memory alloy.

15. The adaptive structure of claim 14, wherein the middle portion of the microscale beam is configured to be laterally displaced relative to a respective micropore of the at least one micorpore of the first structure upon the adaptive structure being exposed to the external heat source.

16. The adaptive structure of claim 15, wherein the middle portion of the microscale beam is configured to be displaced away from a surface of the first structure upon the adaptive structure being exposed to the external heat source.

17. A method of cooling a structure, the method comprising:
flowing fluid from a source of fluid to a skin panel associated with the structure and through a plurality of micropores formed in the skin panel;
exposing the skin panel to an external flow field heat flux;
sensing local temperatures with a plurality of adaptive structures positioned on a surface of the skin panel; and
altering a flow of fluid through at least one micropore of the plurality of micropores with at least one adaptive structure of the plurality of adaptive structures, such that fluid flow rates through the plurality of micropores vary with a thermal load applied by the external flow field heat flux, comprising:
displacing a portion of the at least one adaptive structure of the plurality of adaptive structures laterally with respect to an opening of the at least one micropore of the plurality of microscopes.

18. The method according to claim 17, wherein sensing local temperatures with a plurality of adaptive structures positioned on a surface of the skin panel further comprises sensing local temperatures with a plurality of displacement members of the plurality of adaptive structures.

19. The method according to claim 18, wherein displacing a portion of the at least one adaptive structure of the plurality of adaptive structures comprises displacing a portion of at least one displacement member of the plurality of displacement members relative to the at least one micropore of the plurality of micropores based on the sensed temperature.

20. The method according to claim 19, further comprising forming the plurality of displacement members of at least two different metallic materials.

21. The method according to claim 19, further comprising forming the plurality of displacement members of a shape memory alloy.

22. The method according to claim 21, further comprising forming the plurality of displacement members of a material comprising nickel and titanium.

23. The method according to claim 17, wherein flowing fluid from a source of fluid includes flowing a fuel.

* * * * *

UNITED STATES PATENT AND TRADEMARK OFFICE
CERTIFICATE OF CORRECTION

| | | |
|---|---|---|
| PATENT NO. | : 7,913,928 B2 | Page 1 of 1 |
| APPLICATION NO. | : 11/556988 | |
| DATED | : March 29, 2011 | |
| INVENTOR(S) | : Nicholas Tiliakos et al. | |

It is certified that error appears in the above-identified patent and that said Letters Patent is hereby corrected as shown below:

In the specification:

COLUMN 5, LINE 64, change "integrallyformed" to --integrally formed--

In the claims:

CLAIM 17, COLUMN 18, LINE 37, change "microscopes." to --micropores.--

Signed and Sealed this
First Day of October, 2013

Teresa Stanek Rea
*Deputy Director of the United States Patent and Trademark Office*